Patented Jan. 20, 1953

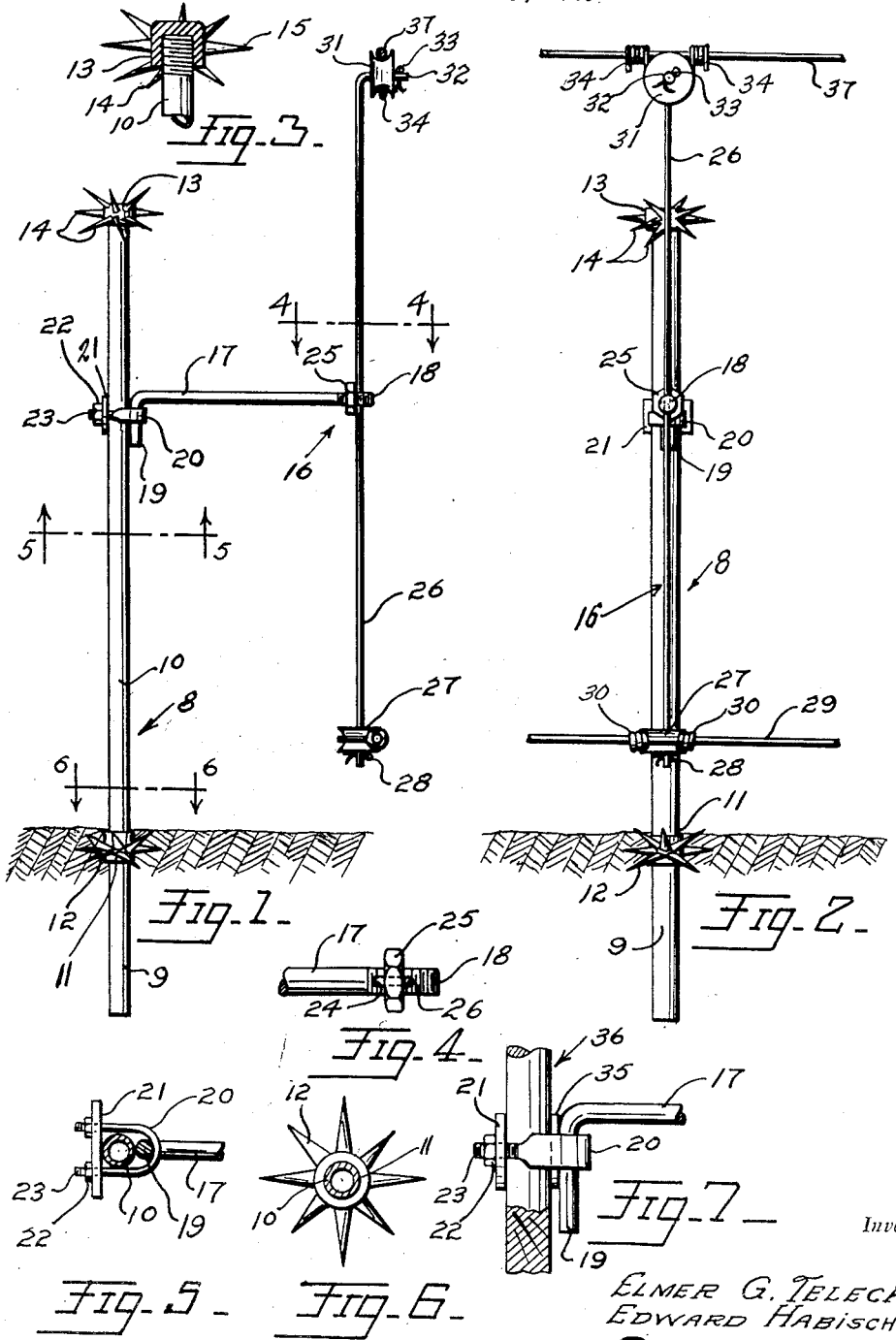

2,626,304

UNITED STATES PATENT OFFICE 2,626,304

ELECTRIC FENCE WIRE ATTACHING MEANS

Elmer G. Telecky, Hutchinson, and Edward Habisch, Winsted, Minn.

Application November 8, 1946, Serial No. 708,550

2 Claims. (Cl. 174—161)

1

The present invention relates to electric fences such as are commonly used in farming districts and has reference in particular to ways and means whereby current conducting wires forming the fence may be vertically adjusted in a simple, expedient and advantageous manner.

More specifically the invention has to do with a post attachment in the form of a horizontally disposable arm and means for clamping same on a post, the outer end of the arm being such that any fence wires associated therewith may be raised and lowered in relation to the ground and the post anchored in the ground, the arrangement making it possible to place the lowermost wire within four or five inches of the ground in order to be sufficiently low to serve as a fence for small pigs, and to be raised in elevation, as conditions require, when the pigs and stock grow in size.

Considered from another point of view it is the principal object of the invention to provide attaching means for electric fence wires which permits the wires to be raised to points sufficiently clear of the ground that a mower, and grass and weed cutting machine may be moved within the vicinity of the post without interference from said wires. In this connection it is to be pointed out that not only are the fence wires adjustable for accommodation of growing stock, and for provision for clearance spaces for mowing, but are adjustable to permit same to be elevated to a point above growing weeds, this in a manner to prevent the weeds from grounding the current by coming into contact with the lower fence wires, as is often the situation when the wires are fixedly supported, as is the usual situation.

More specifically, novelty is predicated upon a simple horizontal arm of appropriate length, means for detachably and adjustably clamping the arm to the post, and a rod adjustably mounted in the outer end of said arm, said rod being vertically disposed, perpendicularly adjustable and provided with upper and lower insulators, properly arranged, to accommodate the current carrying or so called electric fence wire.

Other objects, features and advantages will become more readily apparent from the following description and the accompanying illustrative drawings.

Figure 1 is an elevational view showing a metal fence post, the attachment arm and the rod fixed with insulators for support and retention of the current conducting fence wires.

Figure 2 is a view at right angles to Figure 1 observing same in the direction from right to left.

Figure 3 is a detail view of the screw-cap on the upper end of the post.

Figure 4 is a section taken approximately on the plane of the line 4—4 of Figure 1, looking in the direction of the arrows.

2

Figure 5 is a section on the horizontal line 5—5 of Figure 1.

Figure 6 is a section on the line 6—6 of Figure 1.

Figure 7 is a fragmentary detail view of the arm clamping means with slight addition provided when said means is attached to a wood instead of a metal fence post.

Briefly summarized the invention is in the form of a simple and economical attachment for any suitable type of a post, metal or wooden. It is characterized by a one-piece relatively short rigid rod providing a horizontal arm whose inner end is preferably formed with a depending lateral bend which may be detachably and adjustably connected, by a clevis or clamp, to the stated post. A relatively long linearly straight complemental rod is detachably and adjustably mounted on the outer end of the first rod and insulators are mounted on the upper and lower end portions of the second rod. The insulators are preferably of spool-types and are at right angles to each other.

Referring now to the drawings by distinguishing reference numerals, 8 identifies a metal fence post of ordinary type whose lower end 9 is embedded in the ground and whose upper end portion 10 extends above the ground to the desired height. The junctural region between the portions 9 and 10 is surrounded by a collar 11 provided with outstanding pointed prongs 12 somewhat irregularly arranged, this to provide a guard and to frustrate rooting attempts of pigs to dislodge the post as often happens when no guard is provided.

A similarly constructed cattle guard is provided on the upper end of the post, this comprising a screw-cap 13 on the threaded upper end 14 and said cap having radial spurs or pointed prongs 15. This means is intended to protect cattle and also to interfere with their urge to thrust against the post for purposes of pushing it over.

The principal aspects of the invention have to do with the attachment means denoted generally by the numeral 16. This means comprises, on the one hand, a substantially L-shaped attaching arm 17 whose outer end is screw-threaded as at 18 and whose inner end is laterally bent as at 19 to serve as a retaining element. This retaining element is saddled and clamped in a U-shaped clevis 20 embracing the post and held thereon by a plate 21 which is in turn fastened by nuts 22 on the screw-threaded ends 23. The outer threaded end portion of the arm is provided with a slot as shown in Figure 4 at 24. Also, the slotted threaded end serves to accommodate a binding nut 25 which serves to secure the fence wire supporting rod 26 in place. A spool type insulator 27 is slipped over the lower end of said rod and held in place by a cotter key or pin 28 and the lowermost fence wire 29 fastened thereto by an assembling wire with coiled free ends 30 securing same to the insulator is employed for securing the wire 29 to said insulator. This is best shown in Figure 2 of the drawings. A similar spool-like insulator 31 is mounted on the upper laterally directed end 32 of said rod and held removably in place by a cotter key 33. A retaining and assembling wire is bent around the insulator and has its ends twisted and coiled in place as at 34. If and when the attachment is used on a wooden post, as shown in Figure 7, an extra insert, wear plate, or block 35 is lodged in the clevis 20 between the end 19 and wooden post 36, but otherwise the details are the same as already covered.

We desire to stress the fact that the arm 17 is shiftedly and detachably connected with the post 8 and that the rod 26 which carries the upper and lower fence wires 37 and 29 is raisable and lowerable and is held in adjusted position by the nut 25 bearing against the rod and holding said rod in the keeper slot 24. This permits the insulators to be positioned wherever necessary and also permits the level or plane of the wires to be arranged to meet the varying circumstances and conditions. For use in a hog pasture the rod can be lowered. For use in a cattle pasture said rod can be raised in order to raise the lower wire to the desired height. The arm itself in its present form shall attach to the usual steel post but could also be used on a wooden post as shown in Figure 7.

The arm carrying the wires may be adjusted to within four to five inches of the ground in order to position the lower wire 29 low enough to serve as a fence for smaller pigs and as the pigs grow in size the wire can be raised accordingly.

Besides making possible the raising and the lowering of the charged wires to fit needs as required, the principal benefit, however, of the proposed invention would consist in making it possible and convenient to mow grass and weeds growing up to or about the wire 29 and, as stated, this operation could be safely and effectively done with a mower, thus saving time and doing far better work in the elimination of grass and weeds to prevent them from grounding the electric current. Experience has shown that as weeds and grass grow up about a fence wire electrically charged, and particularly when wet from rainfall or dew, grounding very frequently occurs, thus nullifying the uses and purposes for which the fence itself is intended.

In conclusion, attention is directed to the fact that so far as is known, the instant invention is the first in the electric fence art wherein it is possible to raise and lower the current-carrying wires according to the discretion of the user without having to turn the current off. In all other types of fences with which we are familiar, it is necessary before one adjusts the wires to first turn the electric current "off" and to turn it back "on" after the adjustment is made. It can be appreciated, therefore, that this matter of adjustment with the current "on" during the stage of adjustment is a novel accomplishment in the field under consideration.

It will be plain that the lower spool or insulator may be readily slipped over the lower straight end of the rod 26 and then fastened in place by the cotter key or, if desired, by a nut or the like (not shown). Likewise, the upper spool insulator 31 may be readily slipped over the end 32 and similarly fastened in place, generally by the cotter key shown. It is also apparent that the bend 19 on the inner end of the shorter rod 17, being cylindrical in cross-section may have limited pivotal movement permitting said arm or rod 17 to be swung in a horizontal plane in relation to the post for properly positioning and then tightening and clamping the arm on the post.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shapes, sizes, materials and arrangement of parts may be resorted to in actual practice provided no departure is made from the invention as claimed.

We claim:

1. An electric fence wire supporting an insulating attachment comprising an L-shaped arm, a clamp adapted to connect the inner end of said arm to a fence post or the like in a manner to permit the level of the arm to be regulated according to the discretion of the user and to permit the arm to be otherwise adjusted in respect to the post and ground, the opposite outer end of said arm being screw-threaded and provided with a rod accommodation slot, a complemental rod at right angles to said arm and having its intermediate portion slidably fitted in said slot, a nut carried by the screw threaded portion of said arm and engageable with the adjacent portion of said rod to permit the rod to be adjusted in said slot and then bound and fastened fixedly to the arm, the upper end portion of said rod being laterally bent, and spool-type wire accommodating and attaching insulators removably mounted on the respective ends of said rod.

2. A post attachment for adjustably supporting electric fence wire from a fixed post comprising a relatively short rigid rod adapted to serve as a horizontal arm, said rod being cylindrical in cross-section and one end being adapted to be detachably and adjustably clamped on a post, a second relatively long rod at right angles to said first named rod, means on the other end of said first rod for detachably and adjustably securing an intermediate portion of the second rod to the first rod, one end of said second rod having a lateral bend, the other end being linearly straight, a spool-type insulator removably fitted and retained on said linearly straight end, and a second spool-type insulator fitted and removably retained on said bend, the axes of said insulators being at right angles to each other.

ELMER G. TELECKY.
EDWARD HABISCH.

REFERENCES CITED

The following references are of record in the file of this patent:

UNITED STATES PATENTS

| Number | Name | Date |
|---|---|---|
| 404,110 | Pincus | May 28, 1889 |
| 506,002 | Cousens | Oct. 3, 1893 |
| 873,700 | Buckbee | Dec. 10, 1907 |
| 1,012,102 | Sachs | Dec. 19, 1911 |
| 1,268,972 | Hendee | June 11, 1918 |
| 1,327,749 | Whipp | Jan. 13, 1920 |
| 1,974,080 | Marker et al. | Sept. 18, 1934 |
| 2,163,954 | Lucas | June 27, 1939 |